(12) United States Patent
McColloch

(10) Patent No.: US 8,019,226 B2
(45) Date of Patent: Sep. 13, 2011

(54) OPTICAL TRANSCEIVER MODULE HAVING A LATCHING BAIL MECHANISM THAT USES A CAM LOCK CONFIGURATION

(75) Inventor: Laurence R. McColloch, Santa Clara, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 423 days.

(21) Appl. No.: 12/025,012

(22) Filed: Feb. 2, 2008

(65) Prior Publication Data

US 2009/0196625 A1 Aug. 6, 2009

(51) Int. Cl.
*H04B 10/00* (2006.01)

(52) U.S. Cl. ........ 398/135; 398/164; 398/128; 398/130; 398/139; 385/88; 385/89; 385/90; 385/92; 385/93; 439/638; 439/157; 439/607; 439/372; 361/728; 361/818; 361/709; 361/683

(58) Field of Classification Search .......... 398/135, 398/136, 137, 138, 139, 128, 130, 164, 115, 398/116, 117, 41, 42, 79, 82; 385/88, 89, 90, 92, 93, 53, 76, 139; 439/638, 49, 157, 484, 160, 372, 76.1, 607, 927; 361/728, 732, 733, 683, 727, 709, 818

See application file for complete search history.

(56) References Cited

U.S. PATENT DOCUMENTS 7,350,984 B1 * 4/2008 Togami et al. .................. 385/89
7,594,766 B1 * 9/2009 Sasser et al. .................... 385/89

* cited by examiner

*Primary Examiner* — Hanh Phan

(57) ABSTRACT

An optical transceiver module is provided that has a pivoting bail latching mechanism that is extremely stiff and locks via a cam locking configuration rather than relying on spring-loading forces to bias the latching mechanism to and maintain the latching mechanism in a desired position. The stiffness of the pivoting bail latching mechanism provided by the cam locking configuration better ensures that forces exerted the transceiver module will not cause the transceiver module to come out of the cage while latched.

10 Claims, 8 Drawing Sheets

OPTICAL TRANSCEIVER MODULE HAVING A LATCHING BAIL MECHANISM THAT USES A CAM LOCK CONFIGURATION

TECHNICAL FIELD OF THE INVENTION

The invention relates to optical transceiver modules. More particularly, the invention relates to an optical transceiver module having a latching bail mechanism that uses a cam lock configuration to lock the transceiver module to a cage.

BACKGROUND OF THE INVENTION

In optical communications networks, optical transceiver modules are used to transmit and receive optical signals over optical fibers. On the transmit side of a transceiver module, a light source (e.g., a laser diode) generates amplitude modulated optical signals that represent data, which are received by an optics system of the transceiver module and focused by the optics system into an end of a transmit optical fiber. The signals are then transmitted over the transmit fiber to a receiver node of the network. On the receive side of the transceiver module, the optics system of the transceiver module receives optical signals output from an end of a receive optical fiber and focuses the optical signals onto an optical detector (e.g., a photodiode), which converts the optical energy into electrical energy.

The transmit and receive fiber cables have connectors on their ends, often LC connectors, that are adapted to mate with transmit and receive receptacles, respectively, formed in the transceiver module. A variety of optical transceiver module configurations are used in optical communications network. Some optical transceiver modules have multiple transmit receptacles and multiple receive receptacles for connecting multiple receive and transmit fiber cables to the module. Some transceiver modules having a single receive receptacle and a single transmit receptacle arranged side by side for connecting a single receive fiber cable and a single transmit fiber cable, respectively, to the transceiver module.

The transceiver modules themselves also have mating elements on them that are adapted to mate with mating elements formed on the cages. The cages are contained in racks, and each rack typically includes many cages that are arranged in very close proximity to one another. Each of these cages is configured to receive a transceiver module on the front side of the rack through a front panel of the rack. The transceiver modules are configured so that they may be inserted into and removed from the cages. The modules typically include latching mechanisms that couple to mating features on the cages when the modules are inserted into the cages. In order to remove a module from a cage, the module must be de-latched to decouple the latching mechanism from the features on the cage, which can be challenging when the modules are spaced closely together in the racks.

A variety of different latching mechanism configurations are used on optical transceiver modules. In general, latching mechanisms used on optical transceiver modules include spring loading elements that maintain the latching mechanisms in their locked positions via spring forces. These types of latching mechanisms typically include a bail that is moved to a locked position in order to latch the module to the cage and that is moved to an unlocked position in order to de-latch the module from the cage. When the bail is in the locked position, a latch lock pin extends through an opening formed in the cage to prevent movement of the module relative to the cage and relative to the LC connectors connected to the transmit and receive receptacles. When the bail is in the locked position, the latch lock pin is retracted from the opening formed in the cage, making it possible to remove the module from and insert the module into the cage.

The latching mechanism needs to provide sufficient "stiffness", or rigidity, when in the locked position. When forces are exerted on the optical fiber cables, those forces are transferred from the cable to the LC connector attached to the end of the cable. The forces transferred to the LC connector are then transferred from the connector to the transceiver module housing, and then from the transceiver module housing to the latch lock pin and cage. If the latching mechanism is not sufficiently stiff when the bail is in the locked position, the forces that are transferred from the latch lock pin to the bail can result in unwanted movement of the LC connector relative to the transceiver module housing, and even in de-latching, or unlocking, of the latching mechanism. The resulting movement can cause electrical problems at the electrical connector. If sufficient force is applied, the latch may fail allowing the transceiver to come out of the cage causing an electrical disconnect and possible mechanical damage to the transceiver and cage.

Accordingly, a need exists for an optical transceiver module having a latching mechanism that is sufficiently stiff to prevent forces exerted on the latch lock pin from being translated to the bail.

SUMMARY OF THE INVENTION

The invention provides an optical transceiver module having a latching bail mechanism that utilizes a cam-locking configuration. The optical transceiver module comprises a housing and a latching bail mechanism. The housing has at least a first receptacle and a second receptacle formed therein for receiving a first optical fiber connector and a second optical fiber connector, respectively. The housing includes at least a first locking cam surface. The latching bail mechanism mechanically couples to the transceiver module housing, and includes at least a bail, a lock pin, and at least a first cam follower. The bail is configured to be positioned in a locked position and in an unlocked position. The lock pin is configured to be placed in an extended position and in a retracted position. Placing the bail in the locked position causes the lock pin to be placed in the extended position. Placing the bail in the unlocked position causes the lock pin to be placed in the retracted position. When the bail is being placed in the locked position, the first cam follower comes into contact with the first locking cam surface, causing the first cam follower and the first locking cam surface to exert forces against one another. The exertion of these forces against causes the lock pin to be urged toward the extended position.

These and other features and advantages of the invention will become apparent from the following description, drawings and claims.

DETAILED DESCRIPTION OF AN ILLUSTRATIVE EMBODIMENT

In accordance with various embodiments that will be described herein, an optical transceiver module is provided that has a pivoting bail latching mechanism that incorporates a cam locking configuration rather than a spring loading configuration used by most existing optical transceiver modules to move the latching mechanism to the locked position and maintain it in the locked position. The cam locking configuration provides the pivoting bail latching mechanism with stiffness and robustness in the locked position, thereby ensuring that forces exerted by the optical fiber cables will not result in mechanical misalignment between the cage and the transceiver module.

Figure 1:
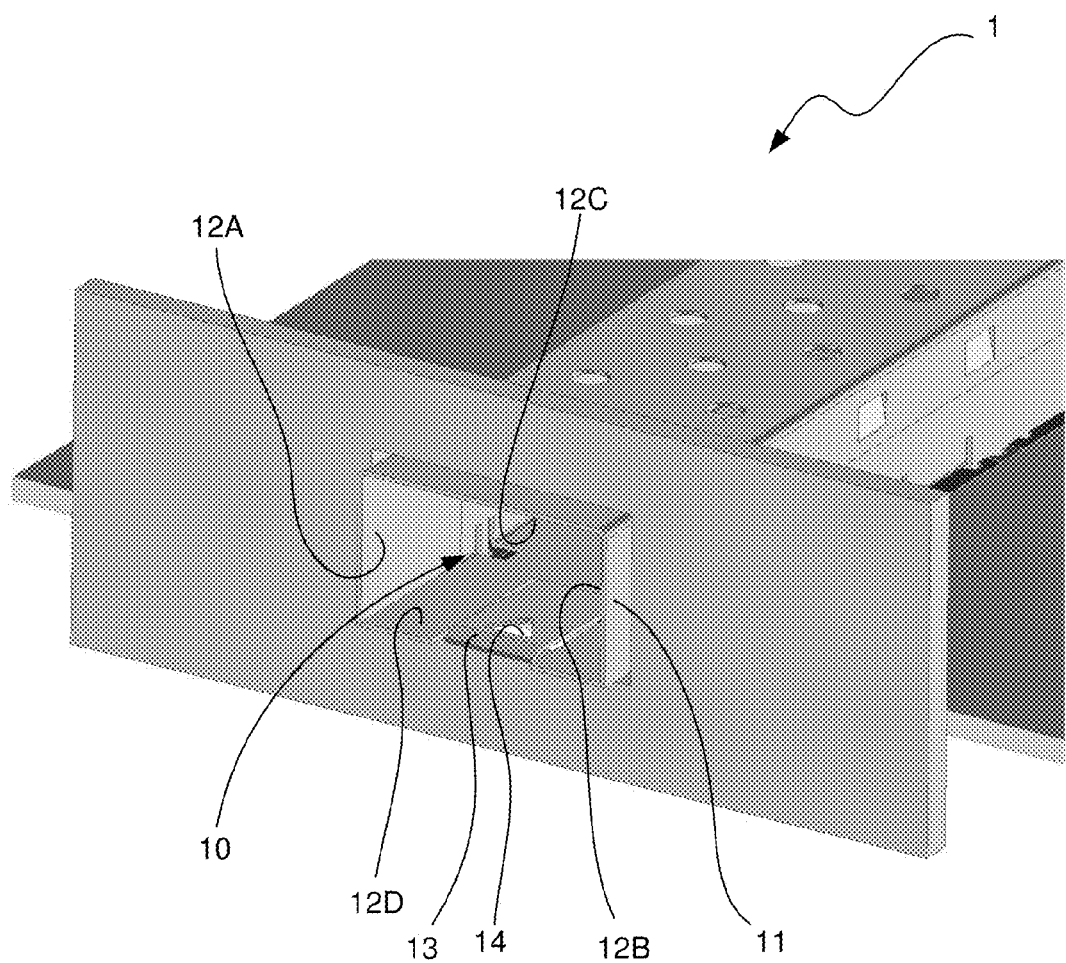
FIG. 1 illustrates a perspective view of a portion of the front side of a rack having a cage secured thereto that is suitable for receiving the transceiver module of the invention.

FIG. 1 illustrates a perspective view of a portion of the front side of a known rack 1 having a cage 10 secured thereto. The cage 10 is typically made of a flexible material, such as sheet metal for example, although other materials, such as die cast zinc are sometimes used. Typically, the rack 1 will contain many such cages mounted one atop the other and side by side in close proximity to one another. The cage 10 has an interior compartment for receiving the transceiver module (not shown) through a front face 11 of the cage 10. The transceiver module is described below in detail with reference to FIGS. 2-5B. The interior compartment of the cage 10 is defined by first and second side walls 12A and 12B, respectively, and top and bottom walls 12C and 12D, respectively. The cage 10 has a leaf spring finger 13 formed on the bottom wall 12D, which is typically made of sheet metal, and an opening 14 formed in the finger 13 that operates as a catch for the latch lock pin (FIG. 3A, item 30H). The catch 14 opening is shaped to receive the latch lock pin.

Figure 2:
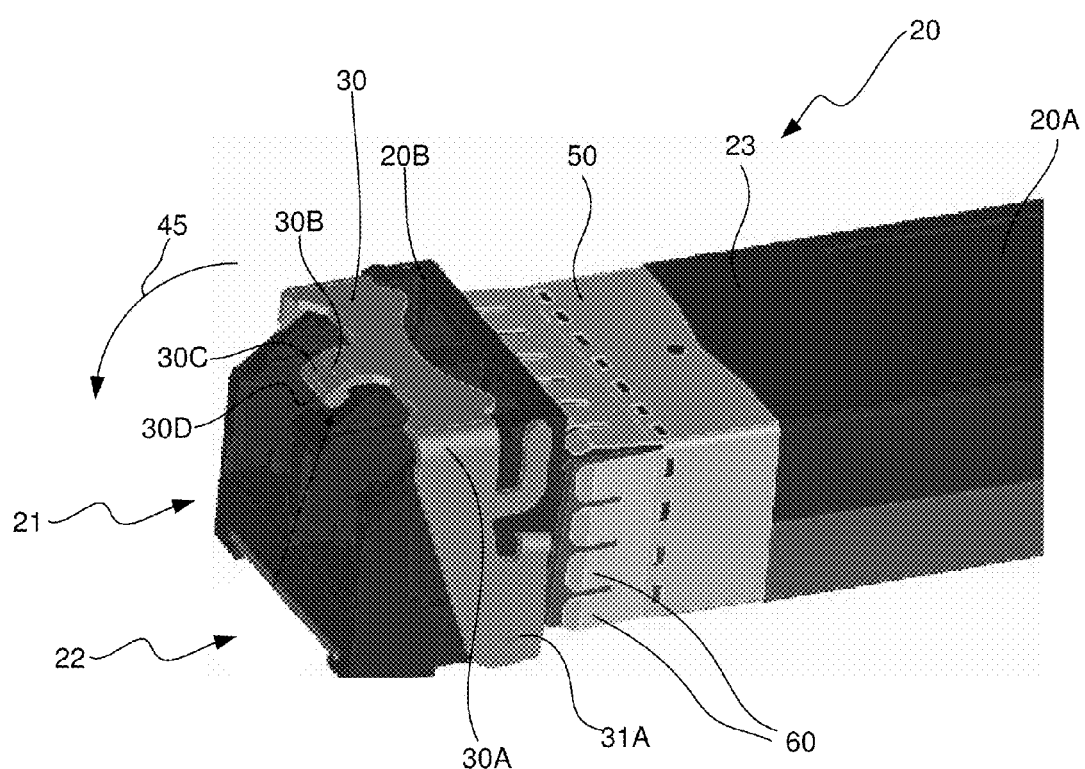
FIG. 2 illustrates a perspective top view of a portion of a transceiver module in accordance with an illustrative embodiment.
Figure 3A:
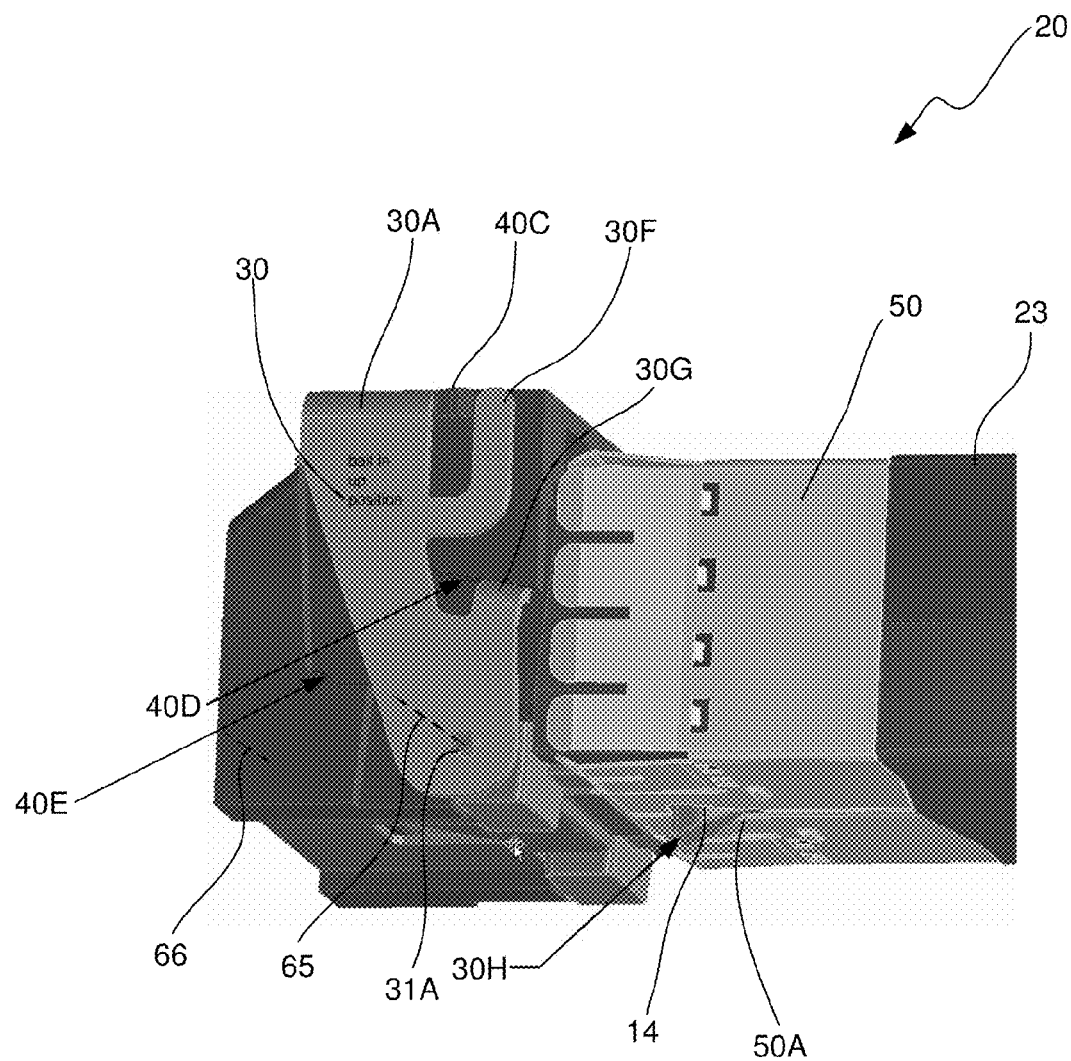
FIG. 3A illustrates a perspective bottom view of a portion of the transceiver module shown in FIG. 2 having a latching bail mechanism, which is shown in a locked position.

FIG. 2 illustrates a perspective top view of a portion of the transceiver module 20 of the invention in accordance with an illustrative embodiment, which shows the latching bail mechanism 30 of the transceiver module 20 in the locked position. The latching bail mechanism 30 is typically made of sheet metal, although other materials may be used for this purpose such as, for example, molded plastic, other metallic materials, etc. Likewise, the transceiver module housing 23 is typically made of sheet metal, although other materials, such as molded plastic, die cast zinc, or other metallic materials, for example, may be used to make the transceiver module 20. The transceiver module 20 has a proximal end portion 20A and a distal end portion 20B. When the transceiver module 20 is inserted into the cage 10 (FIG. 1), the proximal end portion 20A enters the cage 10 first. The transmit and receive receptacles 21 and 22, respectively, remain exposed through the front face 11 of the cage 10 to enable connectors (not shown) such as LC connectors, for example, disposed on the ends of optical fibers (not shown) to be connected to the receptacles 21 and 22 of the module 20.

The latching bail mechanism 30 includes a bail 30A that can be moved from a locked position to an unlocked position, and vice versa. In the locked position shown in FIG. 2, the transceiver module 20 is locked to the cage 10 (FIG. 1) very securely such that any forces that are exerted on the cage 10 that are translated to the latch lock pin (FIG. 3A, item 30H) will not be translated to the bail 30A, as will be described below in detail with reference to FIGS. 3A and 3B. The transceiver module 20 also includes an electromagnetic interference (EMI) collar 50 that is made of conductive material and that has periodically spaced conductive elements 60 thereon for absorbing electromagnetic radiation emanating from within the module 20, and including the opening in the cage 10 that defines the catch 14.

The latching bail mechanism 30 rotates on opposing sides on rotational coupling mechanisms 31A and 31B (not shown) that each rotate about an axis 65. Rotational coupling mechanism 31B is described below with reference to FIG. 3C. The latching bail mechanism 30 also includes a de-latching element 30B that protrudes downwardly and outwardly below the top of the latching bail mechanism 30. In general, known latching mechanisms used today with optical transceiver modules require that a user de-latch them from a position at the top of the latching mechanism. These configurations can present problems when the cages and the transceiver modules are positioned very close to one another in the racks. In such situations, there is very little space between the top of one module and the bottom of the module above it. Consequently, it can be very difficult for a person to place his or her fingers on top of the latch in order to de-latch it, which is necessary in order to remove the module. Because the end portion 30C of the de-latching element 30B is below the top of the module 20, it is very easy for a person to place his or her finger nail on the bottom surface 30D of end portion 30C and exert a downward force on the latching bail mechanism 30 to cause it to rotate downward (in the direction of arrow 45) into the unlocked position, as will now be described in further detail with reference to FIG. 3A.

FIG. 3A illustrates a perspective bottom view of a portion of the transceiver module 20 of the invention in accordance with an illustrative embodiment, which shows the latching bail mechanism 30 of the transceiver module 20 in the locked position. The housing 23 of the optical transceiver module 20 has one or more cam surfaces 40D and 40E formed on it that interact with one or more cam followers 30G of the latching bail mechanism 30, as will be described below in detail. In addition, the transceiver module housing 23 includes one or more locking elements. When the bail 30A of the latching bail mechanism 30 is moved into the locked position depicted in FIG. 3A, an arm 30F that extends from the bail 30A flexes outwardly slightly away from the module housing 23 as it slides over a detent mechanism 40C formed on the module housing 23. In accordance with an embodiment, the detent mechanism 40C is simply a bump formed on the housing 23. After the arm 30F slides over the bump 40C, the bump 40C acts as a detent between the bail 30A and the arm 30F to retain the bail 20A in the upright position shown in FIG. 3A. In this position, the latch lock pin 30H is fully extended through the catch opening 14 and through an opening 50A formed in the EMI collar 50. The size of the bump 40C and the size of the arm 30F are selected to give the transceiver module 20 a desired amount of tension, or stiffness, when the transceiver module 20 is locked to the cage 10, i.e., when the bail 30A is in the upright position shown in FIG. 3A.

The angled cam surface 40D on the housing 23 will be referred to hereinafter as a locking cam surface. The rounded (e.g., semi-circular) cam surface 40E on the housing 23 will be referred to hereinafter as an unlocking cam surface. When neither of the cam surfaces 40D and 40E is in contact with the cam follower 30G of the latching bail mechanism 30, the bail 30A of the latching mechanism 30 is free to rotate in first and second angular directions about an imaginary axis 65 that passes through a rotational coupling element 31A.

When the bail 30 is being moved into the locked position shown in FIG. 3A, the cam follower 30G of the latching bail mechanism 30 comes into contact with the angled locking cam surface 40D and slides for a short distance along the angled locking cam surface 40D. After sliding for a short distance along this surface, the forces exerted by the cam lock 40D and the cam follower 30G against each other prevent further sliding such that any additional movement of the cam follower 30G against the cam lock 40D results the cam follower 30G being slightly compressed by the locking cam surface 40D. Thus, once the arm 30F passes over the bump 40C, the bail 30A is firmly locked, with a high degree of stiffness and robustness, in the upright position depicted in FIG. 3A.

Prior to the bail 30A reaching the locked position, the forces exerted by the locking cam surface 40D and the cam follower 30G on each other cause the axis of rotation of the latching bail mechanism 30A to begin moving from the axis 65 toward the axis 66 in parallel with these axes. Thus, the motion of the bail 30A is relatively complex. When the cam follower 30G stops sliding along the locking cam surface 40D and begins being compressed against the locking cam surface 40D, the axis of rotation of the bail latching mechanism 30A becomes the axis 66. At this time, the bail 30A is no longer rotating, but is being forced in an angular direction for which the center of rotation corresponds to axis 66, as will be described below in more detail with reference to FIG. 4.

Figure 3B:
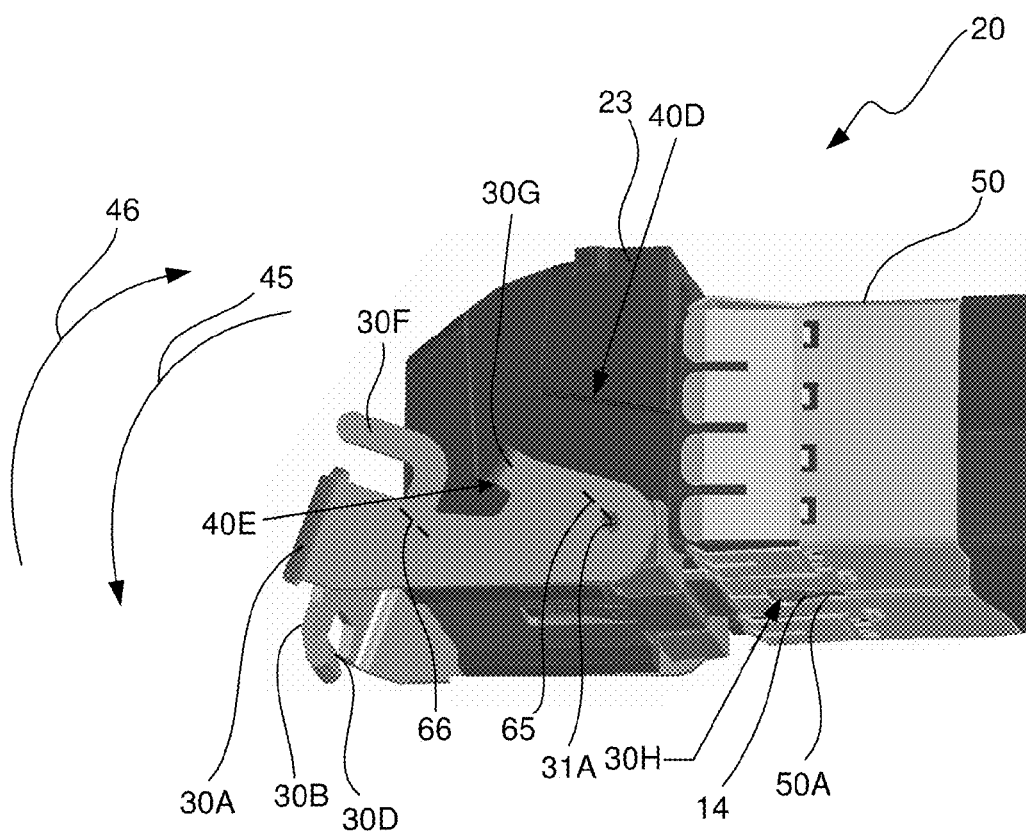
FIG. 3B illustrates a perspective bottom view of a portion of the transceiver module shown in FIG. 2, which shows the latching bail mechanism in the unlocked position.

FIG. 3B illustrates a perspective bottom view of a portion of the transceiver module 20 of the invention in accordance with an illustrative embodiment, which shows the latching bail mechanism 30 of the transceiver module 20 in the unlocked position. In this position, the lock pin 30H is fully retracted and the bail 30A is fully rotated forward in the direction of arrow 45. In this position, the module 20 may be inserted into the cage 10 (FIG. 1) and removed from the cage 10. Because element 13 of cage 10 acts as a spring, the transceiver module 20 may be inserted with the latching bail mechanism 30 in either the locked or de-latched position. Removal of the transceiver module 20 requires the transceiver module 20 to be in the de-latched position.

To remove the module 20 from the cage 10 after the module 20 has been installed and locked, a user can use a fingernail to exert a sufficient amount of force on the bottom surface 30D of end portion 30C to cause the bail 30A to rotate downward in the direction of arrow 45, or alternatively, can place a finger on the side of element 30B to pull the bail 30A in the downward direction. As the user pulls the bail 30A in the downward direction indicated by arrow 45, the cam follower 30G comes into contact with the rounded unlocking cam surface 40E. As the bail 30A continues being rotated in the downward direction after making contact with cam surface 40E, the cam follower 30G begins to slide along the rounded cam surface 40E. As this sliding action is occurring, the axis of rotation of the latching bail mechanism 30 moves from axis 65 to axis 66, and the latching bail mechanism 30 pivots about the new axis of rotation 66. This pivoting action causes the latch lock pin 30H to begin retracting from the catch opening 14 until the latch lock pin 40H reaches its fully retracted position.

Figure 3C:
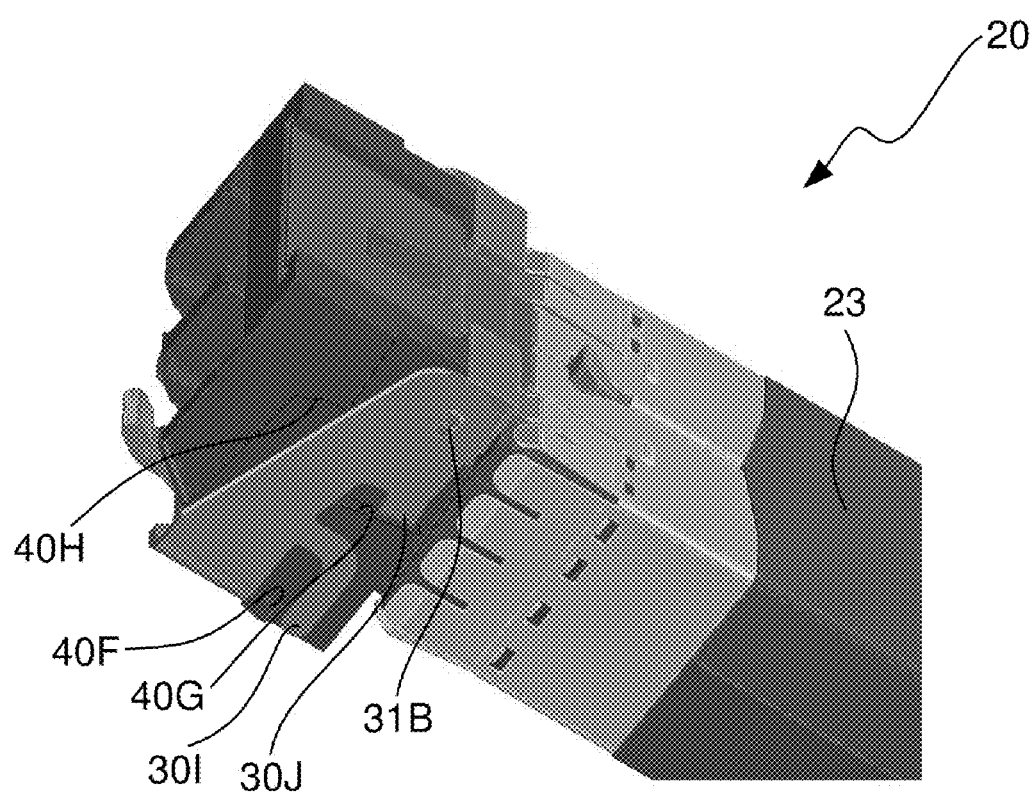
FIG. 3C illustrates a perspective top view of a portion of the transceiver module shown in FIG. 2, which shows the latching bail mechanism in the locked position.

FIG. 3C illustrates a perspective view of a portion of the transceiver module 20 of the invention in accordance with an illustrative embodiment, which shows the latching bail mechanism 30 of the transceiver module 20 in the locked position. The view shown in FIG. 3C shows the module 20 shown in FIG. 3A rotated with reference to the page containing FIG. 3A by about 180° so that the opposite side of the module 20 and latching bail mechanism 30 can be seen. FIG. 3C is provided merely for the purpose of showing the complimentary elements 30I and 30J to elements 30F and 30G, respectively, and the complimentary elements 40F, 40G and 40H to elements 40C, 40D and 40E, respectively. Thus, it can be seen in FIG. 3C that the bail mechanism 30 and the housing 23 of the module 20 have identical configurations on opposite sides thereof.

As stated above, known latching mechanisms rely on spring loading forces to maintain the latching mechanisms in opened or closed positions. In contrast, as described above with reference to FIGS. 2-3C, the latching bail mechanism 30 of the invention uses a cam lock configuration to physically lock the lock pin 30H in its fully extended position (FIG. 3A) and to physically unlock the lock pin 30H to place it in its fully retracted position (FIG. 3B). One of the advantages of the cam locking configuration of the invention is that it is stiffer than spring loaded latches, which better ensures that forces exerted on cable will not cause an unwanted release of the transceiver module 20 out of the cage 10. Because the cam lock configuration is stiffer when in the locked position, the transceiver module 20 is less susceptible to these types of forces and environmental vibration. Consequently, the latching bail mechanism 30 prevents the aforementioned problems associated with the spring loaded latching mechanisms.

Figure 4:
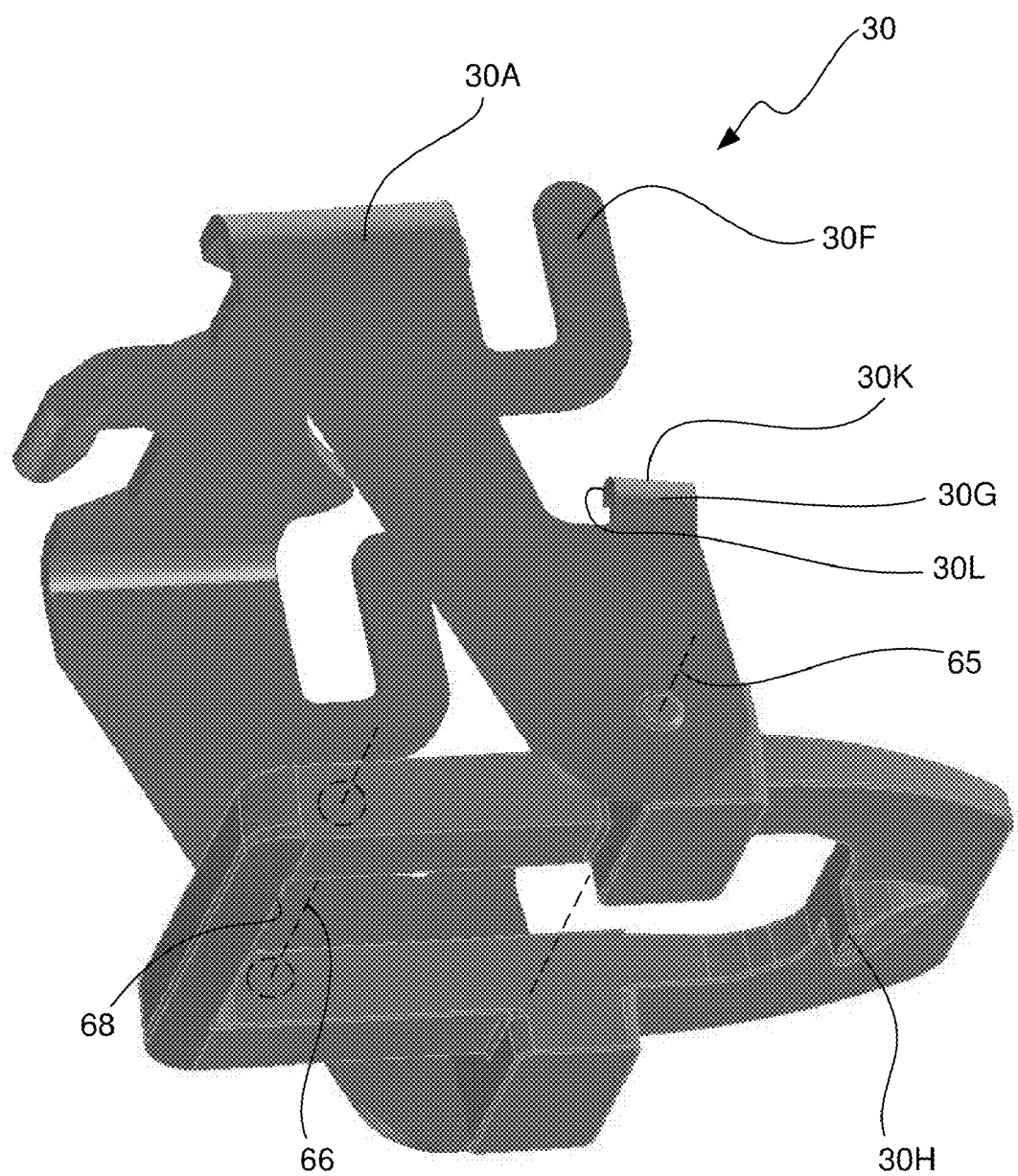
FIG. 4 illustrates a perspective view of the latching bail mechanism without the transceiver module shown in FIGS. 1-3C.

FIG. 4 illustrates a perspective view of the latching bail mechanism 30 without the transceiver module 20 shown in FIGS. 1-3C. The transceiver module 20 is not shown so that the manner in which the latching bail mechanism 30 works can be more clearly demonstrated. When the bail 30A is moved between the locked and unlocked positions, and when the cam follower 30G is not abutting either of the cam surfaces 40D and 40E (FIGS. 3A-3C), the bail 30 has a center of rotation that is about the axis 65, which passes through the rotational coupling mechanisms 31A and 31B (FIG. 4). In general, once the cam follower 30G is in contact with either of the cam surfaces 40D or 40E, the entire latching bail mechanism 30 begins to rotate or pivot about axis 66. This causes the following results. When the latching bail mechanism 30 is being locked, the rotation about axis 66 results in a downwardly directed force being exerted on the latching bail mechanism 30 that forces the lock pin 30H downward though the catch 14 (FIG. 1) and into its extended position. Similarly, when the latching bail mechanism 30 is being unlocked, the rotation about axis 66 in the opposite direction results in an upwardly directed force being exerted on the latching bail mechanism 30 that forces the lock pin 30H upward out of the catch 14 (FIG. 1) and into its retracted position.

Figure 5A:
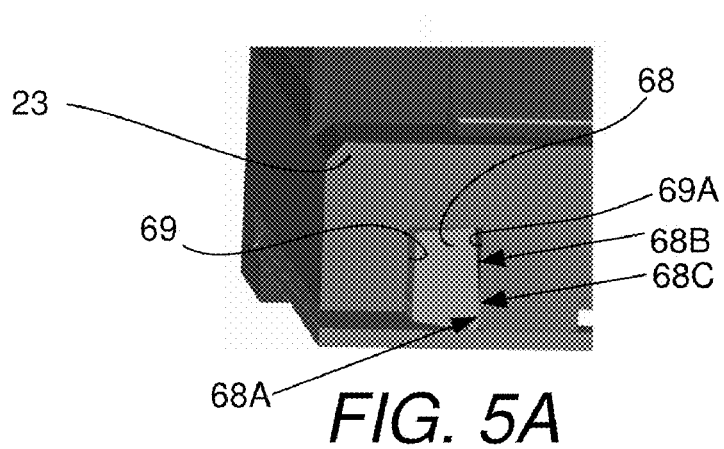
FIGS. 5A and 5B illustrate cross-sectional views the transceiver module shown in FIG. 2 that illustrate the interaction between a lateral base portion of the latching bail mechanism and the module housing in the unlocked and locked positions, respectively.
Figure 5B:
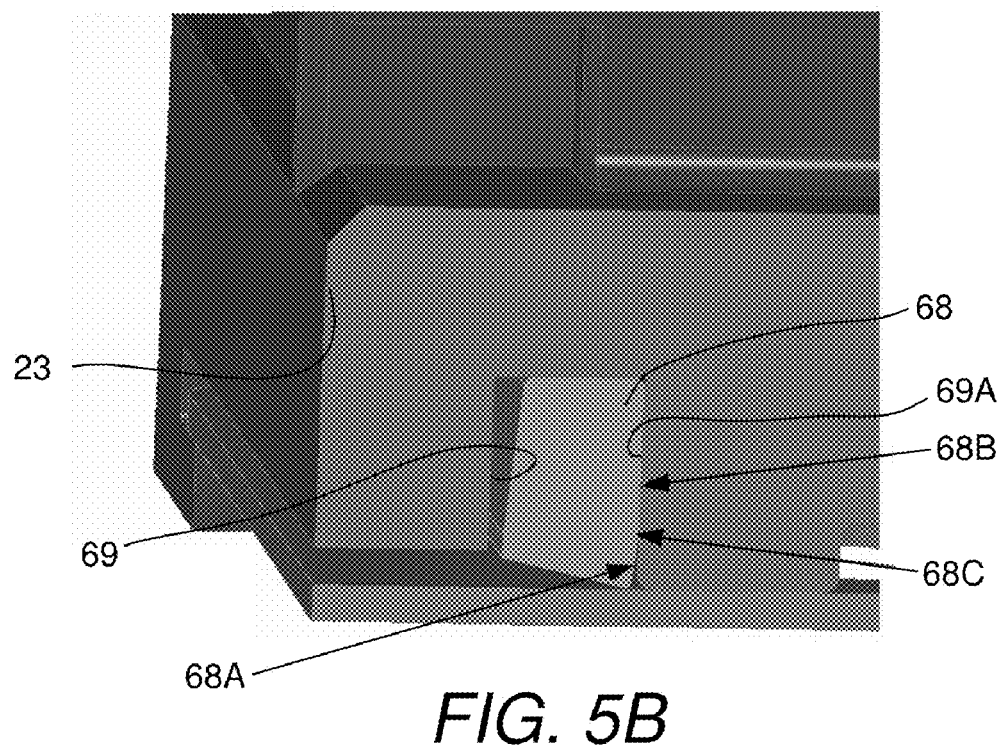

FIG. 5A illustrates a cross-sectional side view of the lateral base portion 68 of the latching mechanism 30 within a recess 69 formed in the housing 23 when the lock pin 30H is in the unlocked (i.e., fully retracted) position. FIG. 5B illustrates a cross-sectional side view of the lateral base portion 68 of the latching mechanism 30 within a recess 69 formed in the housing 23 when the lock pin 30H is in the locked (i.e., fully extended) position. The lateral base portion 68 has a multi-faceted surface comprising a lower surface facet 68A and an upper surface facet 68B. When the bail 30A is in the unlocked position shown in FIG. 5A, the lower surface facet 68A of the lateral base portion 68 is in abutment with the flat surface 69A of the recess 69 formed in the housing 23. In this position, the axis of rotation of the latching bail mechanism 30A is about axis 66 (FIG. 4). Thus, it can be seen that movement of the bail 30A in the downward direction (arrow 45 in FIG. 3B) when the surfaces 68A and 69A are in abutment causes the lock pin 30H to be moved to its fully retracted position.

With reference to FIG. 5B, when the bail 30A is being moved from the unlocked position to the locked position, the lateral base portion 68 pivots at location 68C where the surface facets 68A and 68B meet as the axis of rotation of the latching bail mechanism 30 changes from axis 65 (FIG. 4) to axis 66 (FIG. 4). Thus, the point 68C where the surface facets 68A and 68B meet corresponds to the axis 66. After the lateral base portion 68 has pivoted on point 68C, the surface facet 68B and the flat surface 69A are placed in abutment. In this position, the axis of rotation of the latching bail mechanism 30A is about axis 66 (FIG. 4). Thus, it can be seen that movement of the bail 30A in the upward direction (arrow 46 in FIG. 3B) when the surfaces 68B and 69A are in abutment causes the lock pin 30H to be moved to its fully extended (i.e., locked) position. In the locked position, the large flat surface 69A of the recess is in abutment with the large facet surface 68B. The abutment of these large surfaces 68A and 69A when the lock pin 30H is in the locked position ensures that the lock pin 30H will remain in the fully extended position even if large external forces are exerted on the transceiver module housing 23. In other words, the latching bail mechanism 30 provides the transceiver module with great cage retention strength.

Although a single cam follower 30G comes into contact with both of the cam surfaces 40D and 40E at different times, the latching bail mechanism 30 could have two respective cam followers (not shown) that come into contact with and operate against the respective cam surfaces 40D and 40E. Also, with reference again to FIG. 4, the cam follower 30G can be viewed as two separate cam followers: the surface 30K of cam follower 30G that comes into contact with cam surfaces 40D may be viewed as a first cam follower, and the surface 30L that comes into contact with cam surfaces 40E can be viewed as a second cam follower. Therefore, the transceiver module 20 may be viewed as having first and second cam surfaces and cam followers on one side of the module, and third and fourth cam surfaces and cam followers on the opposite side of the transceiver module 20. Thus, the first and third cam surfaces and the first and third cam followers, respectively, operate against each other in tandem, simultaneously. Likewise, the second and fourth cam surfaces and the second and fourth cam followers, respectively, operate against each other in tandem, simultaneously.

The length of the latching bail mechanism 30, or the distance from the axis 66 to the lock pin 30H, is relatively great compared to known spring loaded latching mechanisms. Consequently, the lock pin 30H experiences less angular movement than that experienced by lock pins used in known spring loaded latching mechanisms of optical transceiver modules. This provides additional advantages. First, the reduced angular motion of the lock pin 30H allows the transceiver module to be compatible with a larger number of cage designs. Second, the longer length of the latching bail mechanism 30 results in less mechanical amplification, which means that the manufacturing tolerances for the transceiver module are less stringent. This, in turn, leads to lower manufacturing costs and an increase in manufacturing yield.

Another advantage of the transceiver module 20 having the latching bail mechanism 30 is that the combination of the EMI collar 50 and the housing of the transceiver module 20 forms a stripper that allows the transceiver module 20 to be easily removed when the latching bail mechanism 30 is in the unlocked position. This feature of the invention is demonstrated in FIG. 6, as will now be described.

Figure 6:
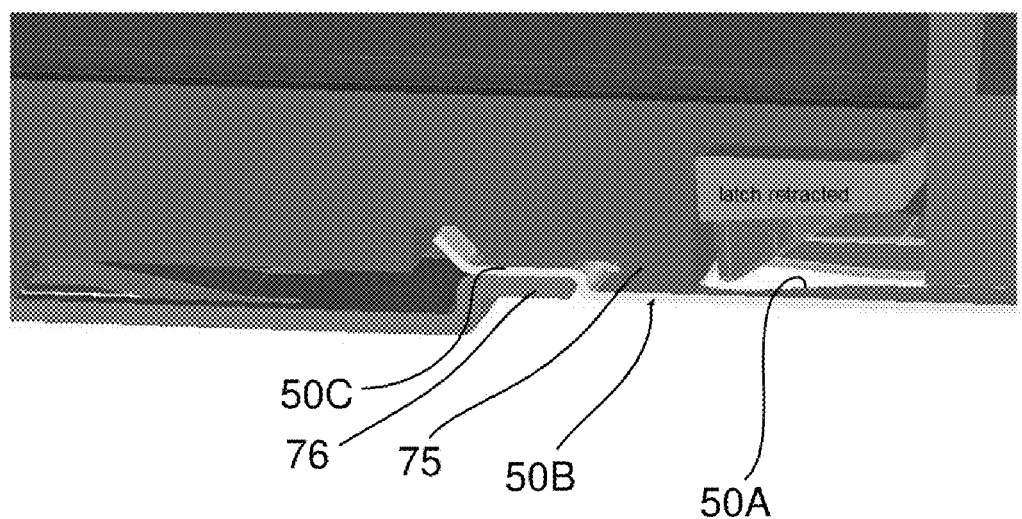
FIG. 6 illustrates a cross-sectional side view of a portion of the transceiver module, wherein the latching bail mechanism is in the unlocked position shown in FIG. 3A.

FIG. 6 illustrates a cross-sectional side view of a portion of the transceiver module, wherein the latching bail mechanism 30 is in the unlocked position shown in FIG. 3A. In this position, the lock pin 30H is fully retracted through the catch 14 (FIG. 1) formed in the cage 10 and through the opening 50A formed in the EMI collar 50. The EMI collar 50 has a flat portion 50B and a bent portion 50C. The portion 75 of the transceiver module housing 23 exerts a downward force on the flat portion 50B of the collar 50. The portion 76 of the transceiver module housing 23 exerts an upward force against the bent portion 50C formed in the collar 50. The combination of these forces pre-loads the portion 50B of the collar 50 such that it is biased slightly in the downward direction with reference to FIG. 6. This pre-loading of the portion 50B around the catch 14 and opening 50A ensures that when the lock pin 30H is fully retracted, the lock pin 30H will easily clear the catch 14 and the opening 50A when the module is stripped from the cage. This also ensures that the cage will not be pulled in the upward direction by the lock pin 30H when the lock pin 30H is retracted.

It should be noted that the invention has been described with reference to a few illustrative embodiments for the purposes of demonstrating the principles and concepts of the invention and the manner in which they may be implemented. The invention is not limited to these embodiments, but rather, a variety of modifications may be made to these embodiments without deviating from the scope of the invention. Also, while certain materials have been described herein as being used to make the transceiver module and the latching bail mechanism, the invention is not limited to using these materials. For example, although the latching bail mechanism has been described as being made of sheet metal, molded plastic and other materials are suitable for this purpose. In addition, while the transceiver module has been described as an optical transceiver module, the module design and the latching bail mechanism having the cam lock configuration may be used for other types of applications for other industrial purposes. Those skilled in the art will understand the manner in which these and other modifications may be made to the embodiments described herein and that all such modifications are within the scope of the invention.

What is claimed is:

1. An optical transceiver module comprising:
    an optical transceiver module housing, the housing having at least a first receptacle and a second receptacle formed therein for receiving a first optical fiber connector and a second optical fiber connector, respectively, the housing including at least a first locking cam surface; and
    a latching bail mechanism mechanically coupled to the optical transceiver module housing, the latching bail mechanism having at least a bail, a lock pin, and at least a first cam follower, the bail being configured to be movable between a locked position and in an unlocked position to place the bail in the locked and unlocked positions, respectively, the lock pin being configured to be placed in an extended position and in a retracted position, wherein placing the bail in the locked position causes the lock pin to be placed in the extended position, and wherein placing the bail in the unlocked position causes the lock pin to be placed in the retracted position, and wherein when the bail is being placed in the locked position, the first cam follower comes into contact with the first locking cam surface causing the first cam follower and the first locking cam surface to exert forces against one another, the exertion of the forces against one another causing the lock pin to be urged toward the extended position.

2. The optical transceiver module of claim 1, wherein when the bail is being moved from the unlocked position to the locked position and prior to the first locking cam surface and the first cam follower contacting each other, the bail rotates through a range of angles about a first axis of rotation in a first angular direction, wherein when the first cam follower and the first locking cam surface are exerting forces against one another, the latching bail mechanism rotates through a range of angles about a second axis of rotation in a second angular direction, and wherein the rotation of the latching bail mechanism in the second angular direction causes the lock pin to be urged toward the extended position.

3. The optical transceiver module of claim 2, wherein the transceiver housing further includes at least a first cam unlocking surface, the first cam unlocking surface and the first cam follower coming into contact with one another when the bail is being placed in the unlocked position, wherein when the bail is being moved toward the unlocked position and prior to the first cam unlocking surface and the first cam follower contacting each other, the bail rotates about the first axis of rotation through a range of angles in a third angular direction of rotation, wherein when the first cam follower and the first cam unlocking surface are in contact with one another as the bail is being placed in the unlocked position, the first cam follower and the first cam surface act against one another to cause the latching bail mechanism to rotate through a range of angles about the second axis of rotation in a fourth angular direction, and wherein the rotation of the latching bail mechanism in the fourth angular direction causes the lock pin to be urged toward the retracted position.

4. The optical transceiver module of claim 3, wherein the transceiver housing further includes at least a second cam locking surface and wherein the latching bail mechanism further includes at least a second cam follower, and wherein when the bail is being placed in the locked position, the second cam follower comes into contact with the second locking cam surface causing the second cam follower and the second locking cam surface to exert forces against one another, the exertion of the forces by the second cam follower and the second cam locking surface against one another causing the lock pin to be urged toward the extended position.

5. The optical transceiver module of claim 4, wherein when the bail is being moved from the unlocked position to the locked position and prior to the second locking cam surface and the second cam follower contacting each other, the bail rotates through said range of angles about the first axis of rotation in said first angular direction, wherein when the second cam follower and the second locking cam surface are exerting forces against one another, the latching bail mechanism rotates through said range of angles about said second axis of rotation in said second angular direction, and wherein the rotation of the latching bail mechanism in said second angular direction causes the lock pin to be urged toward the extended position.

6. The optical transceiver module of claim 5, wherein the transceiver housing further includes at least a second cam unlocking surface, the second cam unlocking surface and the second cam follower coming into contact with one another when the bail is being placed in the unlocked position, wherein when the bail is being moved toward the unlocked position and prior to the second cam unlocking surface and the second cam follower contacting each other, the bail rotates about said first axis of rotation through a range of angles in said third angular direction of rotation, wherein when the second cam follower and the second cam unlocking surface are in contact with one another as the bail is being placed in the unlocked position, the second cam follower and the second cam surface act against one another to cause the latching bail mechanism to rotate through said range of angles about said second axis of rotation in said fourth angular direction, and wherein the rotation of the latching bail mechanism in said fourth angular direction causes the lock pin to be urged toward the retracted position.

7. The optical transceiver module of claim 6, wherein first and third angular directions are opposite angular directions with reference to the first axis of rotation and wherein the second and fourth angular directions are opposite angular directions with reference to the second axis of rotation.

8. The optical transceiver module of claim 1, wherein the latching bail mechanism further comprises a de-latching element having an end portion that extends below a top surface of the bail when the bail is in the locked position, the end portion of the de-latching element being disposed to allow a person or device to de-latch the latching bail mechanism by contacting a bottom surface of the end portion with a fingernail or device and pulling the end portion in a direction away from the transceiver module housing.

9. The optical transceiver module of claim 8, wherein the transceiver module housing further includes at least a first detent mechanism on a first side of the housing and wherein the bail latching mechanism further includes a first arm that extends a distance outward from the bail, wherein when the bail is in the locked position, the detent mechanism is positioned in a space between the bail and the arm and retains the bail in the locked position unless a sufficient force is applied to the end portion of the de-latching element to cause the arm to flex in a direction away from the transceiver module housing and pass over the detent mechanism.

10. The optical transceiver module of claim 9, wherein the transceiver module housing further includes at least a second detent mechanism on a second side of the housing opposite the first side of the housing, and wherein the bail latching mechanism further includes a second arm that extends a distance outward from the bail on an opposite side of the latching bail mechanism from the first arm, wherein when the bail is in the locked position, the second detent mechanism is positioned in a space between the bail and the second arm and retains the bail in the locked position unless a sufficient force is applied to the end portion of the de-latching element to cause the second arm to flex in a direction away from the transceiver module housing and pass over the second detent mechanism.

* * * * *